US009696793B2

United States Patent
Ross et al.

(10) Patent No.: US 9,696,793 B2
(45) Date of Patent: Jul. 4, 2017

(54) SYSTEMS AND METHODS FOR SELECTABLY SUPPRESSING COMPUTING INPUT EVENTS TRIGGERED BY VARIABLE PRESSURE AND VARIABLE DISPLACEMENT SENSORS

(71) Applicants: Carlos L. Ross, Miami, FL (US); Danae Sierra, Miami, FL (US); Eyzen Medina, Miami, FL (US); Alonzo F. Seay, Austin, TX (US)

(72) Inventors: Carlos L. Ross, Miami, FL (US); Danae Sierra, Miami, FL (US); Eyzen Medina, Miami, FL (US); Alonzo F. Seay, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 324 days.

(21) Appl. No.: 14/271,055

(22) Filed: May 6, 2014

(65) Prior Publication Data

US 2015/0323987 A1    Nov. 12, 2015

(51) Int. Cl.
*G09G 5/00*    (2006.01)
*G06F 3/01*    (2006.01)
*G06F 3/023*   (2006.01)
*G06F 3/033*   (2013.01)
*G06F 3/038*   (2013.01)

(52) U.S. Cl.
CPC ............... *G06F 3/01* (2013.01); *G06F 3/023* (2013.01); *G06F 3/033* (2013.01); *G06F 3/038* (2013.01)

(58) Field of Classification Search
CPC . G06F 3/01; G06F 3/023; G06F 3/033; G06F 3/038
See application file for complete search history.

(56) References Cited

U.S. PATENT DOCUMENTS 3,936,674 A     2/1976   Hughes
6,102,802 A *   8/2000   Armstrong ............. A63F 13/06
                                              463/37

(Continued)

OTHER PUBLICATIONS

Liendo et al., "Systems and Methods for Executable File Identity Capture During Indirect Application Launch", U.S. Appl. No. 14/182,647, filed Feb. 18, 2014, 27 pgs.

(Continued)

*Primary Examiner* — Amare Mengistu
*Assistant Examiner* — Crystal A Mathews
(74) *Attorney, Agent, or Firm* — Egan, Peterman, Enders & Huston LLP.

(57) ABSTRACT

Systems and methods are disclosed herein that may be implemented to selectably suppress computing input events that are generated for an information handling system based on output signals received from a variable pressure or displacement (VPD) sensor that correspond to one or more pressure or displacement zones defined for the VPD sensor. Using the disclosed systems and methods, computing input events based on sensor output signals from one or more given VPD sensing zones may be selectably suppressed and/or withheld during sensor pressure or displacement changes from further host system processing according to a time delay, e.g., as a function of the elapsed time taken for a user to depress or release a given VPD sensor.

16 Claims, 5 Drawing Sheets

(56) References Cited

U.S. PATENT DOCUMENTS

| | | | |
|---|---|---|---|
| 6,758,615 B2* | 7/2004 | Monney | G06F 3/0202 400/477 |
| 8,674,941 B2 | 3/2014 | Casparian et al. | |
| 8,700,829 B2 | 4/2014 | Casparian et al. | |
| 9,046,999 B1* | 6/2015 | Teller | G02B 27/017 |
| 2005/0057515 A1* | 3/2005 | Bathiche | G06F 3/0233 345/168 |
| 2008/0246634 A1* | 10/2008 | Alberth | G06F 1/1624 341/24 |
| 2009/0140985 A1* | 6/2009 | Liu | G06F 3/011 345/168 |
| 2009/0207055 A1* | 8/2009 | Aull | G06F 3/0219 341/34 |
| 2009/0278792 A1* | 11/2009 | Toebes | G06F 21/83 345/156 |
| 2010/0148999 A1 | 6/2010 | Casparian et al. | |
| 2010/0321301 A1 | 12/2010 | Casparian et al. | |
| 2011/0095877 A1 | 4/2011 | Casparian et al. | |
| 2011/0102326 A1 | 5/2011 | Casparian et al. | |
| 2013/0067126 A1 | 3/2013 | Casparian et al. | |
| 2014/0267052 A1* | 9/2014 | Chow | G06F 3/038 345/168 |
| 2014/0282007 A1* | 9/2014 | Fleizach | G06F 9/4446 715/728 |

OTHER PUBLICATIONS

Casparian et al., "Systems and Methods for Implementing Spring Loaded Mechanical Key Switches With Variable Displacement Sensing", U.S. Appl. No. 14/013,724, filed Aug. 29, 2013, 57 pgs.

Ross et al., "Systems and Methods for Configuring and Controlling Variable Pressure and Variable Displacement Sensor Operations for Information Handling Systems", U.S. Appl. No. 14/209,382, filed Mar. 13, 2014, 47 pgs.

* cited by examiner

SYSTEMS AND METHODS FOR SELECTABLY SUPPRESSING COMPUTING INPUT EVENTS TRIGGERED BY VARIABLE PRESSURE AND VARIABLE DISPLACEMENT SENSORS

FIELD OF THE INVENTION

This application relates to variable pressure and variable displacement sensors for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems use keyboards to obtain user input. Some prior keyboard solutions have provided pressure sensitive keys. The most common technique to provide pressure sensitive keys is to use variable resistance sensing techniques to provide an indication of the pressure applied by a user to a key. Variable capacitance sensing has also been utilized in some prior art products such as console gamepad controllers.

SUMMARY OF THE INVENTION

Systems and methods are disclosed herein that may be implemented to selectably suppress computing input events that are generated for an information handling system based on output signals received from a variable pressure or displacement (VPD) sensor that correspond to one or more pressure or displacement zones defined for the VPD sensor. Examples of such VPD sensors include VPD human touch controls (e.g., such as keyboard key, mouse button, touch pad, etc.) for which boundaries have been defined between multiple pressure or displacement zones corresponding to VPD output signals for a given VPD sensing user control. Using the disclosed systems and methods, computing input events based on sensor output signals from one or more given VPD sensing zones may be selectably suppressed and/or withheld during sensor pressure or displacement changes from further host system processing according to a time delay, e.g., as a function of the elapsed time taken for a user to depress or release a given VPD sensor.

As used herein, the term "depress" is used to describe both physical movement of a VPD sensor (e.g., by a human user) in a manner that results in greater displacement and/or greater pressure being applied to a depressed sensor, and increased pressure being exerted (e.g., by a human user) on a non-movable pressure-sensitive VPD sensor that itself responds by producing a VPD sensor output signal that represents increasing applied pressure. Similarly, the term "release" is used to describe both physical movement of a VPD sensor (e.g., by a human user) in a manner that results in less displacement and/or pressure being applied to a depressed sensor, and to less pressure exerted (e.g., by a human user) on a non-movable pressure-sensitive VPD sensor that itself responds by producing a VPD sensor output signal that represents decreasing applied pressure.

In one embodiment, a given computing input event (e.g., computing event such as given keystroke, mouse click, etc.) may be assigned (e.g., by a user) to each given VPD sensing zone of a human touch control VPD sensor such that the assigned event is triggered when the touch control is activated by human user touch, and its variable pressure or displacement (VPD) sensor output signals are sampled and fall within the boundaries of that zone. Such a user touch control may be configured to be manipulated by a user with varying pressure or displacement such that its sampled output signals will always first pass through a zone of lowest pressure or displacement (e.g., zone 1) where a first computing input event is triggered and provided to information handling system components for further processing while the sensor is on its way to a zone of second or greater pressure of displacement (e.g. zone 2) where a second and potentially different computing input event is then triggered and provided to information handling system components for further processing. In such a case, the disclosed systems and methods may be implemented in one embodiment to enable a user to selectably suppress the first computing input event from further information handling system processing, and instead trigger only the second or subsequent computing input event for processing. In a further embodiment, once the touch control is released by a user, all events (e.g., both first and second events described above) may be suppressed from further processing as a touch control returns to its mechanical released (e.g., unpressed) position.

In one exemplary embodiment, a first user-configurable time delay may be employed before sampling output signals from a given VPD sensor to effectively suppress generation of any computing input events associated with the VPD sensor output signals (e.g., according to corresponding VPD sensing zones) that would otherwise be produced and provided for further information handling system processing in response to output signals received from the given VPD sensor prior to expiration of the first time delay. In such an embodiment, VPD sensor output signals may be sampled and corresponding computing input events generated only upon expiration of the time delay so as to effectively suppress generation of any earlier computing input events for further processing that would otherwise be triggered based on VPD sensor output signals received during the duration of the time delay. For example, such a time delay may be initiated (e.g., by starting a timer) when output signals from a given VPD sensor enter a first VPD sensing zone for the first time that the VPD sensor is activated from a non-activated state. During the period of this first time delay, no computing input events will be generated that correspond to the VPD levels represented by the VPD sensor output signals received during this time. After the first time delay expires, VPD sensor output signals may be subsequently sampled to establish the identity of the current (e.g., final) VPD sensing zone, and a computing input event corresponding to the current VPD sensing zone then triggered and provided for further processing. Thus, in one embodiment, a quick downward push of a human touch control may be used to effectively suppress computing input events corresponding to earlier (e.g., lower) VPD sensing zone/s when desired. In a further exemplary embodiment, a user may be given the ability to select the first time delay value as needed for best results, after which the first time delay value may become persistent once set.

In a further exemplary embodiment, a second time delay value (e.g., of same or different magnitude as the first time delay) may be initiated (e.g., by starting a timer) after output signals from a given VPD sensor have entered and passed beyond a first or lower VPD sensing zone to a second or higher VPD sensing zone, and then begin moving back towards the first or lower VPD sensing zone. During the period of this second time delay, no computing input events will be generated for further processing that correspond to the VPD levels represented by the VPD sensor output signals received during this time. After the second time delay expires, VPD sensor output signals may be subsequently sampled to identify whether the VPD sensor remains activated in one of the VPD sensing zones (e.g., such as the first or lowest VPD sensing zone), or is no longer being activated (e.g., no downward user pressure is being exerted on the VPD sensor). In this regard, a VPD sensor may be identified as no longer activated when a VPD output sensor is of 0 value, or of a value below a pre-determined threshold. Thus, if the user intention is to release or deactivate the VPD sensor, the assigned computing input events of the lower VPD sensing zones are suppressed. For example, when a given VPD sensor that is assigned two VPD sensing zones (lower VPD sensing zone 1 and higher VPD sensing zone 2) is released by a user from the higher VPD sensing zone 2 to an unpressed condition, computing input events assigned to lower zone 1 will be suppressed during a second time delay that is initiated upon release of the VPD sensor even though the VPD output signals from the VPD sensor pass through lower VPD sensing zone 1. However, if a user continues pressing the given VPD sensor such that VPD output signals from the given VPD sensor remain in the lower VPD sensing zone 1 upon expiration of the second time delay, then computing input events assigned to the lower VPD sensing zone 1 will not be suppressed, but instead provided to other components of an information handling system for further processing.

In one respect, disclosed herein is a variable pressure or displacement (VPD) sensor system, including: at least one VPD sensor coupled to provide a VPD sensor output signal that includes raw sensor data that is representative of the real time pressure or displacement currently being applied to the VPD sensor; and VPD circuitry coupled to receive the VPD sensor output signal from the at least one VPD sensor. The VPD circuitry may include at least one first processing device configured to: process the raw sensor data of the received VPD sensor output signal to determine whether the real time pressure or displacement currently being applied to the VPD sensor corresponds to one of a defined first zone of lower sensed pressure or displacement being currently applied to the VPD sensor or a defined second zone of higher sensed pressure or displacement being currently applied to the VPD sensor, each of the defined first and second VPD zones being associated with a particular computing input event, select the computing input event associated with the particular defined VPD zone which corresponds to the real time pressure or displacement currently being applied to the VPD sensor, and generate a VPD circuitry output signal including the selected computing input event to a second processing device only after a duration of a time delay period that begins when pressure or displacement is at least partially applied to the VPD sensor, when existing pressure or displacement is at least partially released from the VPD sensor, or a combination thereof.

In another respect, disclosed herein is an information handling system including: a variable pressure or displacement (VPD) sensor system including VPD circuitry that includes at least one first processing device; and a second processing device that is configured as a host processing device to execute at least one application. The VPD sensor system may be coupled to exchange information and data with the host processing device; and the VPD sensor system may further include at least one VPD sensor coupled to provide a VPD sensor output signal to the VPD circuitry, the VPD sensor output signal including raw sensor data that is representative of the real time pressure or displacement currently being applied to the VPD sensor. The first processing device of the VPD circuitry may be configured to: process the raw sensor data of the received VPD sensor output signal to determine whether the real time pressure or displacement currently being applied to the VPD sensor corresponds to one of a defined first zone of lower sensed pressure or displacement being currently applied to the VPD sensor or a defined second zone of higher sensed pressure or displacement being currently applied to the VPD sensor, each of the defined first and second VPD zones being associated with a particular computing input event, select the computing input event associated with the particular defined VPD zone which corresponds to the real time pressure or displacement currently being applied to the VPD sensor, and generate a VPD circuitry output signal including the selected computing input event to the host processing device only after a duration of a time delay period that begins when pressure or displacement is at least partially applied to the VPD sensor, when existing pressure or displacement is at least partially released from the VPD sensor, or a combination thereof.

In another respect, disclosed herein is a method of processing variable pressure or displacement (VPD) sensor output signals, including: receiving a VPD sensor output signal in VPD circuitry that includes at least one first processing device, the VPD sensor output signal including raw sensor data that is representative of the real time pressure or displacement currently being applied to the VPD sensor. The method may also include using the at least one first processing device of the VPD circuitry to: process the raw sensor data of the received VPD sensor output signal to determine whether the real time pressure or displacement currently being applied to the VPD sensor corresponds to one of a defined first zone of lower sensed pressure or displacement being currently applied to the VPD sensor or a defined second zone of higher sensed pressure or displacement being currently applied to the VPD sensor, each of the defined first and second VPD zones being associated with a particular computing input event, select the computing input event associated with the particular defined VPD zone which corresponds to the real time pressure or displacement currently being applied to the VPD sensor, and generate a VPD circuitry output signal including the selected computing input event to a second processing device only after a duration of a time delay period that begins when pressure or displacement is at least partially applied to the VPD sensor, when existing pressure or displacement is at least partially released from the VPD sensor, or a combination thereof.

DESCRIPTION OF ILLUSTRATIVE EMBODIMENTS

Figure 1:
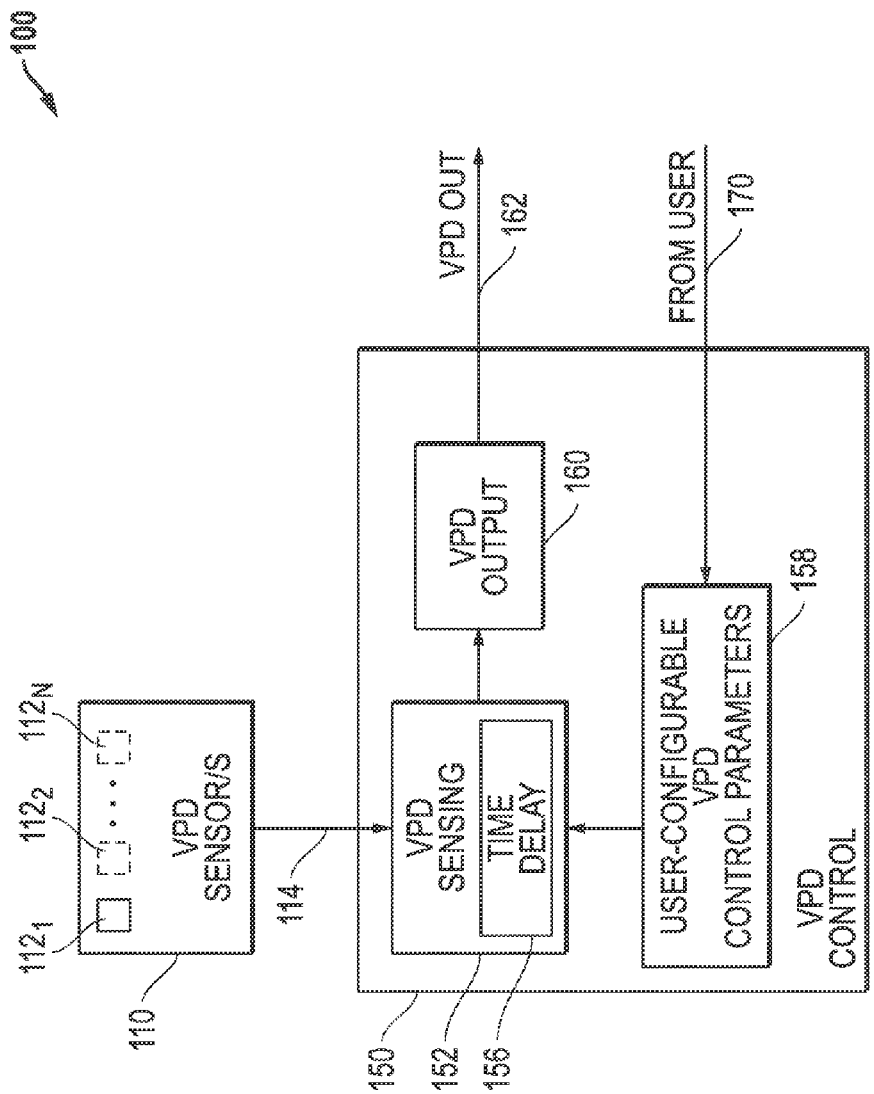
FIG. 1 illustrates a block diagram of a sensor system according to one exemplary embodiment of the disclosed systems and methods.
Figure 5:
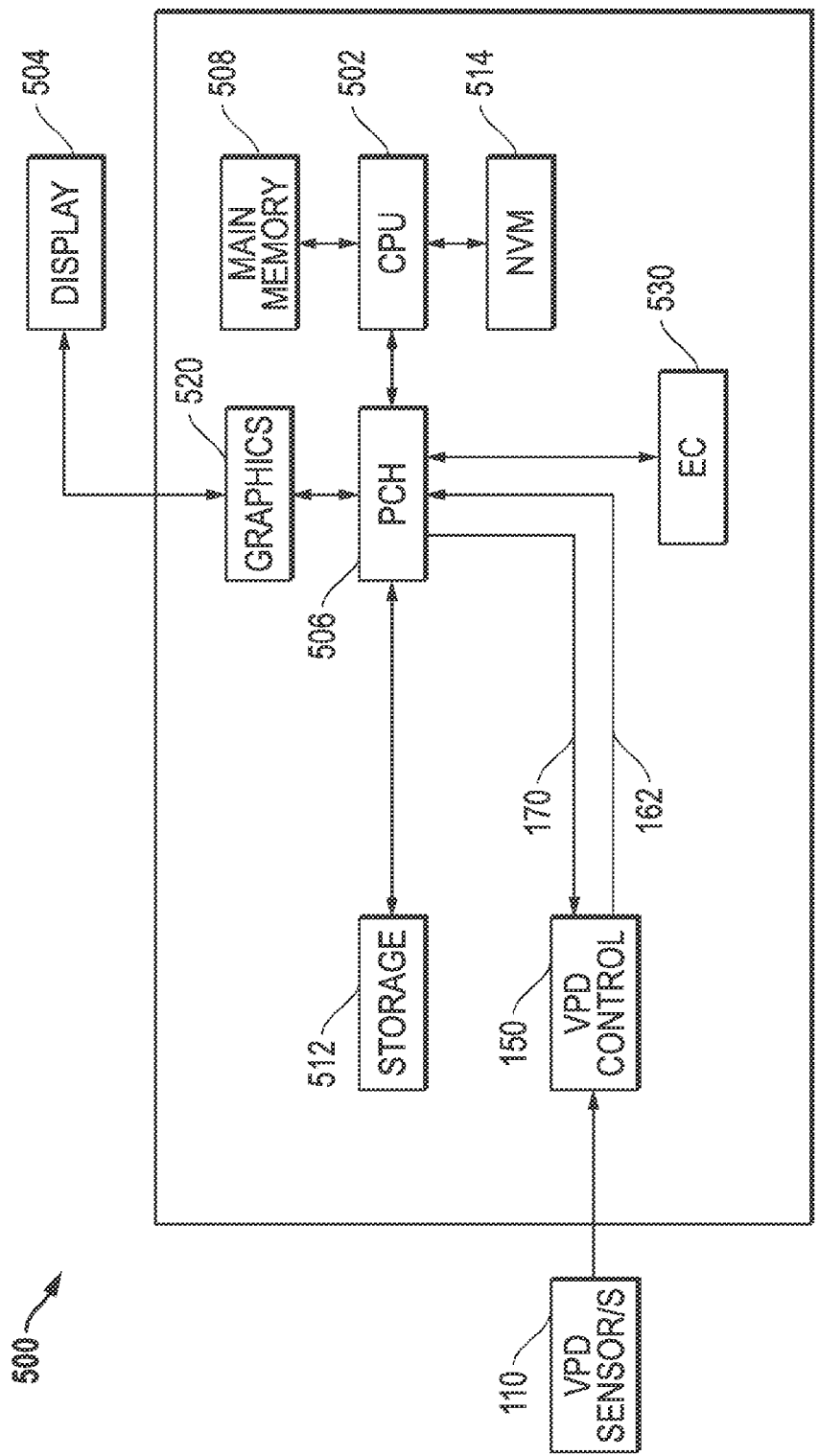
FIG. 5 illustrates a block diagram of an information handling system according to one exemplary embodiment of the disclosed systems and methods.

FIG. 1 is a block diagram of a VPD sensor system 100 as it may be configured according to one exemplary embodiment of the disclosed systems and methods. In the illustrated embodiment, sensor system 100 (e.g., keyboard system or other human touch control system) includes an input device 110 (e.g., internal or external QWERTY keyboard or other internal or external keyboard device body, game controller, computer mouse, touchpad, etc.) that includes one or more VPD sensors 112 that are coupled as shown to provide VPD sensor output signal/s 114 representative of the pressure or displacement applied to individual depressed VPD keys 112 of input device 110 to VPD circuitry 150, which may include, for example, a VPD controller as described further herein or other suitable VPD-configured processing device. VPD circuitry 150 may in turn provide VPD circuitry output signals 162 that include computing input events (e.g., for a host information handling system 500 such as illustrated in FIG. 5) based on a VPD sensing zone assigned to a range of pressure or displacement applied to individual depressed VPD keys 112 (e.g., as pressure or displacement-based key codes, as an alternating high and low (high/low) digital output bit stream signal, or as other suitable output signals). Each of these VPD circuitry output signals 162 correspond to a particular combination of the key identity and real time specific pressure or displacement applied to individual depressed analog keys or other type of VPD sensor/s 112. It will be understood that in one embodiment input device 110 and VPD circuitry 150 may be optionally integrated together into a single input device chassis.

VPD sensor/s 112 of FIG. 1 represent sensors that are detected as being depressed by a variable amount of pressure or displacement. When a VPD sensor 112 is depressed, an VPD sensor output signal 114 indicating the force or extent to which it is depressed is provided to VPD circuitry 150. VPD circuitry 150 may be provided in one exemplary embodiment as an integrated part of a keyboard device body, game controller, mouse, etc. However, one or more components and/or processing tasks of VPD circuitry 150 may alternatively be integrated or otherwise implemented within a microcontroller that is operating as a keyboard controller 110 and/or as part of a host system to which the keyboard is connected, if desired. One or more of the components of VPD circuitry 150 may also be implemented with external and/or analog circuitry, as well. Thus, it will be understood that the components and/or processing tasks of VPD circuitry 150 may be implemented by any alternative configuration of one or more processing devices (e.g., controller, microcontroller, processor, microprocessor, ASIC, FPGA, CPU, etc.) of an information handling system or a peripheral component thereof, and alone or together with other types of information handling system processing tasks.

Further information on example types of variable pressure sensors (e.g., keys) and associated circuitry, digital key sensors and associated circuitry, and methods and circuitry for sensing and processing signals from the same may be found in U.S. patent application Ser. No. 12/316,703 filed Dec. 16, 2008 (U.S. Publication No. 2010-0148999A1); U.S. patent application Ser. No. 12/802,468 filed Jun. 8, 2010 (U.S. Publication No. 2010-0321301A1); U.S. patent application Ser. No. 12/930,125 filed Dec. 29, 2010 (U.S. Publication No. 2011-0102326A1); U.S. patent application Ser. No. 12/930,118 filed Dec. 29, 2010 (U.S. Publication No. 2011-0095877A1); and U.S. patent application Ser. No. 13/232,707 filed Sep. 14, 2011 (U.S. Publication No. 2013-0067126); and U.S. patent application Ser. No. 14/182,647 filed Feb. 18, 2014, each of which is incorporated herein by reference in its entirety for all purposes. Further information on example types of variable displacement sensors (e.g., keys) and associated circuitry may be found in U.S. patent application Ser. No. 14/013,724 filed Aug. 29, 2013; and in U.S. patent application Ser. No. 14/209,382 filed Mar. 13, 2014, each of which is also incorporated herein by reference in its entirety for all purposes.

In the embodiment of FIG. 1, VPD circuitry 150 includes a pressure and/or displacement (VPD) sensing block 152 that receives an analog signal representative of the pressure or displacement being applied to each of VPD sensors 112. VPD circuitry 150 may also include VPD output block 160 that is configured to in turn provide VPD circuitry output signals 162 including any suitable type of computing input events based on a VPD sensing zone assigned to a range of pressure or displacement applied to individual depressed VPD keys 112. For example, in one embodiment, VPD output block 160 may be provided as a key code look up table (e.g., stored in non-volatile memory associated with or otherwise accessible by VPD circuitry 150) that is utilized to select and output across output signal path 162 a computing input event in the form of a pressure or displacement-based key code that corresponds to the particular real-time pressure or displacement being applied to each of VPD sensors 112 to external devices (e.g., such as a keyboard controller or an information handling system host processor) through communication path 162 in a manner as described in U.S. patent application Ser. No. 13/232,707 filed Sep. 14, 2011 (U.S. Pat. No. 8,700,829); and in U.S. patent application Ser. No. 14/209,382 filed Mar. 13, 2014, each of which is incorporated herein by reference in its entirety.

In another embodiment, VPD output block 160 may be provided as switching circuitry and optional keyboard controller that are coupled to receive an alternating key pressure indication signal in the form of a high and low (high/low) digital output bit stream signal from VPD sensing block 152 having a frequency that is representative of the current pressure or displacement being applied to each of VPD sensors 112 and to respond by providing a computing input event in the form of corresponding toggled alternating open/short (off/on) digital signals, momentary-on digital signals, or other suitable data format which corresponds to the depressed VPD sensor 112 to a host system in a manner as described in U.S. patent application Ser. No. 12/802,468 filed Jun. 8, 2010 (U.S. Publication No. 2010-0321301A1); and U.S. patent application Ser. No. 12/930,125 filed Dec. 29, 2010 (U.S. Pat. No. 8,674,941, each of which is incorporated herein by reference in its entirety.

It is noted that communication path 162 may take a variety of forms. For example, communication path 162 may be a wired communication path or a wireless communication path, as desired. With respect to personal computer systems, such as desktop computers and laptop computers, communication path 162 may be, for example, via a Bluetooth interface if a wireless interface is desired and or a USB (universal serial bus) interface if a wired interface is desired. However, it is again noted that any desired communication interface may be utilized. It is further noted that VPD circuitry 150 may be implemented as a microcontroller (e.g., a Texas Instruments MSP430F55xx family of USB enabled 16-bit ultra-low power microcontrollers (such as the MSP430F5508), available from Texas Instruments of Dallas, Tex.) that runs firmware stored on a memory device associated with the microcontroller. Any other type of suitable pressure or displacement-sensing digital output circuitry may be employed including, for example, circuitry that uses RC discharge time to measure sensor capacitance as described in U.S. Pat. No. 3,936,674, which is incorporated herein by reference in its entirety. It will further be understood that the particular embodiments illustrated herein are exemplary only, and that the components and function of VPD circuitry 150 may be implemented using any one or more circuitry components suitable for receiving analog signals representative of key pressure or displacement from VPD sensor/s 112, and for selecting and providing in real time VPD output signals 162 that include computing input events corresponding to the key pressure or displacement applied to each of VPD sensors 112.

It will be understood that in one embodiment external devices may optionally communicate control and/or other configuration information to the VPD circuitry 150 through communication interface 170. In this regard, it is also noted that the user configuration information 158 may be optionally stored in random access memory (RAM) or other volatile memory or non-volatile memory (NVM) memory storage device/s that is associated with VPD sensing circuitry 150 (either internally or externally) and accessible by processing device/s of VPD circuitry 150. Thus, configurable VPD sensor control parameters 158 may be stored, for example, on a RAM or NVM device in a keyboard, game controller, host system (e.g., on a hard drive) or other device and may provide a wide variety of configurable parameters that may be adjusted by a user and/or an application, e.g., through an application programming interface (API) to a software utility application executing on host processing device 502 of FIG. 5 that provides a graphic user interface (GUI) on display 504 to allow a user to edit the parameters through the software utility, and/or using a VPD protocol 175 through a VPD API as described in U.S. patent application Ser. No. 14/209,382 filed Mar. 13, 2014, which is incorporated herein by reference in its entirety.

For example, the user configuration information may be stored, for example, in nonvolatile or volatile memory on board the sensor system 100. Alternatively, the user configuration information may be stored on the host system (e.g., in storage or memory components of information handling system 500 of FIG. 5) or other device that is coupled by communication path 170 or other suitable communication path. Either way, single and/or multiple different user configuration files and/or multiple game (or application) configuration files may be stored allowing a user to select the applicable or desired keyboard configuration file depending on the game or application being used by the user and/or depending upon the particular user using the keyboard at the time, e.g., in a manner as described in U.S. patent application Ser. No. 12/316,703 filed Dec. 26, 2008 (U.S. Publication No. 2010-0148999); U.S. patent application Ser. No. 14/209,382 filed Mar. 13, 2014; U.S. patent application Ser. No. 13/232,707 filed Sep. 14, 2011 (U.S. Pat. No. 8,700,829); U.S. patent application Ser. No. 12/930,125 filed Dec. 29, 2010 (U.S. Pat. No. 8,674,941); U.S. patent application Ser. No. 12/802,468 filed Jun. 8, 2010 (U.S. Publication No. 2010-0321301A12); each of which is incorporated herein by reference in its entirety. Examples of possible information handling system components which may provide such configuration information may also be found described in the above incorporated patent applications and illustrated and described herein in relation to FIG. 5 as well.

Still referring to FIG. 1, VPD sensing block 152 may be configured to implement a first time delay 156 to selectably suppress computing input events that are provided for an information handling system via VPD output signals 162 based on output signals received from a given VPD sensor 112 that correspond to one or more pressure or displacement zones defined for the given VPD sensor 112. In this regard, a first time delay 156 may be implemented (e.g., as a timer) each time one of VPD sensors 112 is depressed or otherwise activated (e.g., by human touch) to postpone sampling of VPD sensor output signal/s 114 or to otherwise suppress generation of VPD output signals 162 until expiration of a defined time period defined by the first time delay 156. After expiration of first time delay 156, VPD sensor output signal/s 114 may be subsequently sampled, and a computing input event corresponding to the current VPD sensor output signal/s 114 then triggered and provided by VPD output signal 162 as a computing input event (e.g., to a keyboard controller or an information handling system host processor) for further processing. In another exemplary embodiment, a second time delay 156 (e.g., of same or different magnitude as the first time delay) may be alternatively or additionally initiated after VPD sensor output signals 114 from a given VPD sensor 112 indicate that a given depressed or otherwise activated VPD sensor 112 is being at least partially released. During the period of this second time delay 156, no computing input events will be generated by VPD output signal 162 for further processing (e.g., by a keyboard controller or an information handling system host processor). After the second time delay 156 expires, VPD sensor output signals 162 may be subsequently sampled to identify whether the given VPD sensor 112 remains depressed or otherwise activated. In any case, duration of a first or second time delay 156 may be user-configurable, e.g., via communication interface 170 or other suitable user control communication path.

Figure 2:
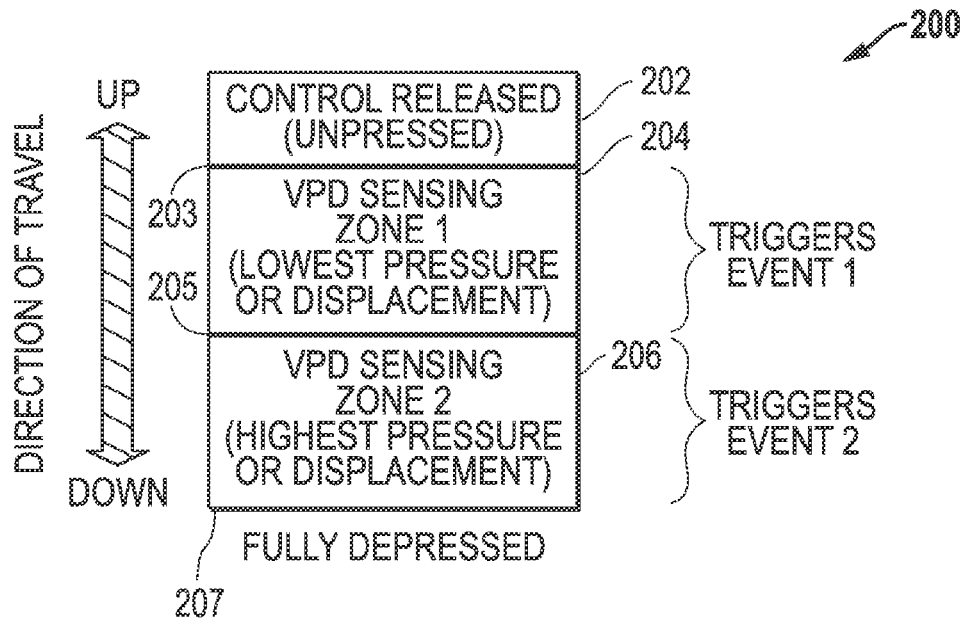
FIG. 2 illustrates VPD sensor output configuration according to one exemplary embodiment of the disclosed systems and methods.
Figure 3:
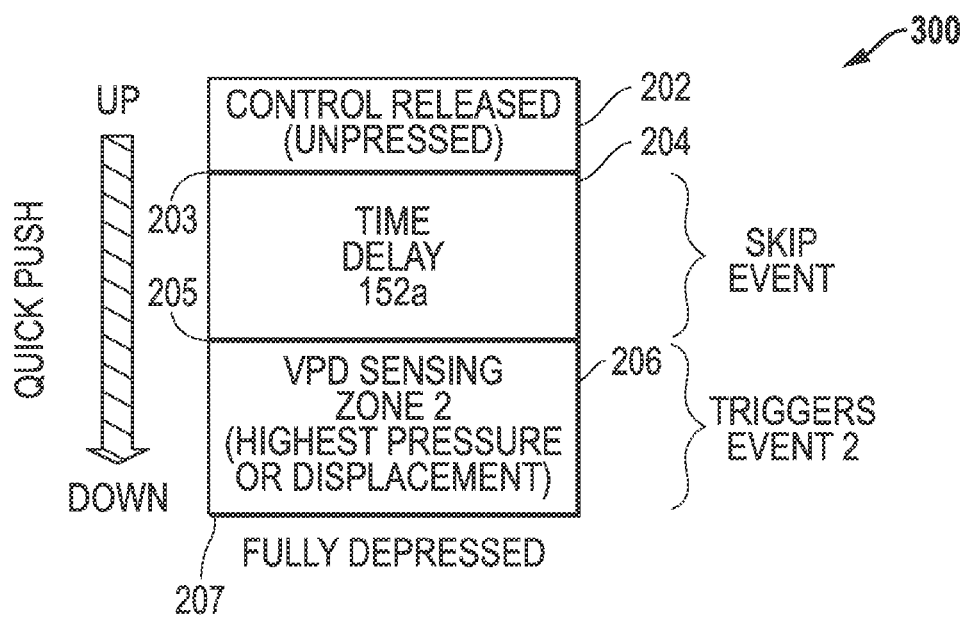
FIG. 3 illustrates VPD sensor output configuration according to one exemplary embodiment of the disclosed systems and methods.
Figure 4:
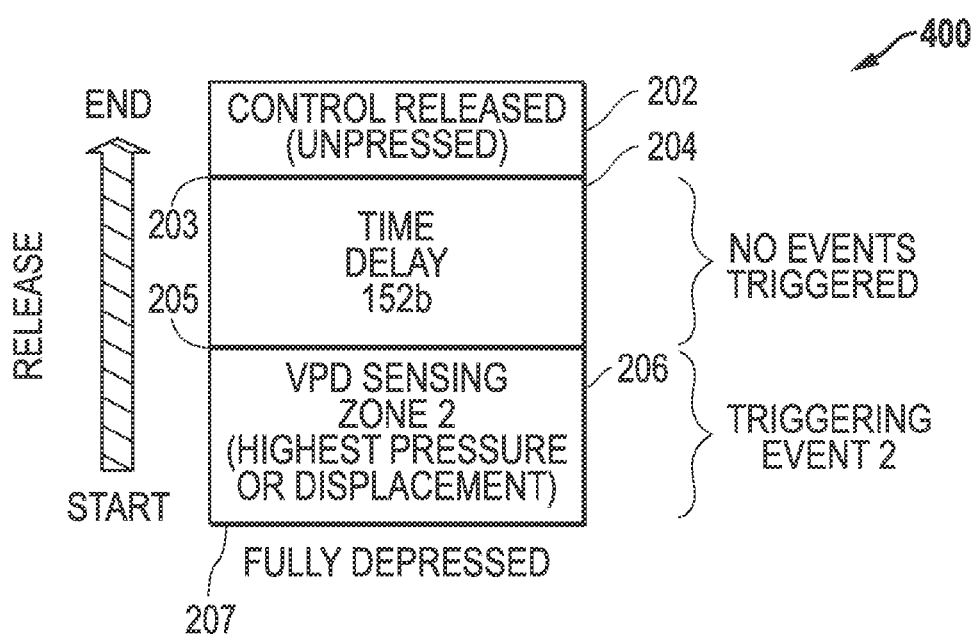
FIG. 4 illustrates VPD sensor output configuration according to one exemplary embodiment of the disclosed systems and methods.

FIGS. 2-4 illustrate one exemplary embodiment of how VPD circuitry 150 may utilize time delay 156 to selectably suppress computing input events generated by VPD output signals 162 in response to analog signals 114 received from VPD sensor/s 112 (e.g., such as variable pressure or displacement human touch controls). Although described below in reference to sensor system 100 of FIG. 1, it will be understood that the technique of FIGS. 2-4 may alternatively be implemented using any other configuration of keyboard system suitable for processing VPD sensor output signals from one or more VPD sensors and providing corresponding computing input events, e.g., to a keyboard controller, host processor (e.g., CPU), etc. In the illustrated embodiment of FIGS. 2-4, two VPD sensing zones 204 and 206 have been defined and stored in user configuration information 158, e.g. by a user across communication interface 170. It will be understood that in alternative embodiments, more than two VPD sensing zones may be similarly defined in a similar manner for a given VPD sensor 112. In the embodiment of FIG. 1, each of VPD sensing zones 204 and 206 may correspond to a respective defined zone of sensor pressure (e.g., range of sensor pressure) or sensor displacement (e.g., range of sensor displacement) represented by VPD output signals 114 received from a given VPD sensor 112.

As shown, VPD sensing zone 204 is defined to extend from its lower boundary 203 with released (e.g., non-depressed) condition 202 to its upper boundary 205 that is defined between VPD sensing zone 204 and VPD sensing zone 206. VPD sensing zone 206 in turn extends between its lower boundary 205 (same as upper boundary of zone 204) to its fully depressed upper boundary 207. Thus, in this embodiment, boundary 203 may represent no sensed pressure or displacement is currently being applied to a given VPD sensor 112, and boundary 205 may represent an intermediate amount of sensed pressure or displacement currently applied to the given VPD sensor 112, e.g., an amount of pressure or displacement that is in-between no amount of sensed pressure or displacement and a highest possible amount of sensed pressure or displacement for the given VPD sensor 112. Similarly, boundary 207 may represent a highest possible amount of sensed pressure or displacement (e.g., sensor fully depressed) that is currently being applied to the given VPD sensor 112.

In the embodiment of FIGS. 2-4, configuration information 158 may be used to assign a different respective computing input event to each of VPD sensing zones 204 and 206 for a given VPD sensor 112, such that when the given VPD sensor 112 is depressed by a user, VPD circuitry 150 provides (via VPD output signals 162) a respective assigned computing input event that corresponds to the real time VPD sensing zone 204 or 206 to which the given VPD sensor 112 is currently depressed by the user, i.e., as represented by the current VPD sensor output signal 114 received by VPD sensing block 152 from the given VPD sensor 112. For example, VPD 204 and 206 may be associated with different key codes or key code macros from each other, or may be associated with different frequencies of a toggled alternating open/short (off/on) digital signal from each other. Thus, for a given VPD sensor 112 that is assigned two pressure zones 204 and 206, zone 204 may be configured to trigger sending of a first computing input event as keystroke "1" via VPD output 162, and zone 206 may be configured to trigger sending of a second and different computing input event as keystroke "2" via VPD output 162. In an embodiment where each of keystroke "1" and keystroke "2" are keycodes, both computing input events may be handled at the system OS level (USB HID or PS2), and the user may skip sending keystroke "1" with a quick downward finger gesture, and only send keystroke "2". In one exemplary embodiment, when a user depresses and holds a given VPD sensor 112 within a given VPD sensing zone (e.g., such as zone 204 or 206), VPD circuitry 150 may respond by repeatedly outputting a respective assigned computing event (e.g., e.g., by a defined digital key repeat rate via VPD output 162) that corresponds to the current VPD sensing zone for the depressed VPD sensor 112 for as long as the user maintains the VPD sensor 112 in the given VPD sensing zone.

In one embodiment, during normal operation (e.g., such as illustrated for VPD sensor output configuration 200 of FIG. 2) no computing input event is provided by VPD output signals 162 when the given VPD sensor 112 is not depressed and its VPD sensor output signal 114 has a value that lies within VPD sensing zone 202. A first computing input event is always provided by VPD output signals 162 when the given VPD sensor 112 is partially depressed to produce a VPD sensor output signal 114 having a value that lies within VPD sensing zone 204, followed by a second and different computing input event provided by VPD output signals 162 as the given VPD sensor 112 is depressed further to produce a VPD sensor output signal 114 having a value that lies within VPD sensing zone 206. Upon release of a fully depressed VPD sensor 112 during normal operation, the first computing event is again always provided by the VPD output signal 162 as the value of the VPD sensor output signal 114 returns from VPD sensing zone 206 to VPD sensing zone 202 through VPD sensing zone 204.

Referring now to FIG. 3, suppression of the computing input event associated with VPD sensing zone 204 is illustrated for VPD sensor output configuration 300 using a sensor depression time delay 152a during a relatively quick depression by a user of a given VPD sensor 112 from its fully released position (corresponding to VPD sensing zone 202) to its fully depressed position (corresponding to boundary 207). As shown in FIG. 3, sensor depression time delay 152a has been selected (e.g., by user input via communication path 170 to configuration information 158) to have a value such that the time delay 152 is operative to suppress any computing input event from VPD output circuitry 160 during the time that the VPD sensor output signal 114 of the given VPD sensor 112 has a value that lies within VPD sensing zone 204 during depression of the VPD sensor 112. In one embodiment, sensor depression time delay 152a may be exerted or initiated when the value of a VPD sensor output signal 114 of a given VPD sensor 112 enters the first VPD zone 204 for the first time that the given VPD sensor 112 is activated (e.g., depressed), and during which sampling and/or output of comparing input event associated with the VPD sensor output signal 114 of the given VPD sensor 112 is suppressed. Later, a subsequent sampling of VPD output signal 114 for the given VPD sensor 112 is made after expiration of the sensor depression time delay 152a to establish the current VPD zone that corresponds to a later position (e.g., final downward position) of the VPD sensor 112, and the corresponding computing input event assigned to this current VPD zone is triggered. It will be understood that although a relatively quick depression operation of a VPD sensor 112 is described above in relation to FIG. 3, duration of sensor depression time delay 152a may be selected to be of any desired value that is suitable for a given application and/or user. Thus, greater values of sensor depression time delay 152a may be selected such that relatively slow depression of a given VPD sensor may result in suppression of an assigned computing input event during the time that the VPD sensor output signal 114 of the given VPD sensor 112 has a value that lies within VPD sensing zone 204.

For example, given an anticipated quick depression (e.g., push downwards) of VPD sensor having a duration of about 1 seconds from fully released to fully depressed position, a sensor depression time delay 152a of about 0.2 seconds may be selected such that no computing input event is produced during the entire time that VPD sensor output signal 114 of the given VPD sensor 112 has a value that lies within VPD sensing zone 204 as the given VPD sensor 112 is being depressed by the user and the resulting VPD sensor output signal 114 passes with increasing sensor pressure or displacement downwards through VPD zone 204. Consequently, only the computing event associated with VPD sensing zone 206 is produced during the subsequent sampling of VPD sensor output signal 114 that occurs only after expiration of sensor depression time delay 152a. It is noted that a user may control the timing or rate with which a given VPD sensor 112 is depressed so as to intentionally cause a computing input event associated with VPD sensing zone 204 to be produced rather than suppressed during VPD sensor depression, e.g., by only partially depressing the given VPD sensor 112 so that the extent of pressure or displacement represented by VPD sensor output signal 114 remains in VPD sensing zone 204 at the expiration of sensor depression time delay 152a. It will be understood that the above example times for full VPD sensor depression duration and sensor depression time delay 152a are exemplary only, and that any other greater or lesser values of sensor depression time delay 152a may be selected based on any other greater or lesser values of anticipated user sensor depression duration as may be suitable or desired for a given application, e.g., based on particular type of VPD sensors 112 and/or anticipated user behavior.

Referring now to FIG. 4, suppression of the computing input event associated with VPD sensing zone 204 is illustrated for VPD sensor output configuration 400 using sensor release time delay 152b during a relatively quick release by a user of a given depressed VPD sensor 112 from its fully depressed position (corresponding to VPD sensing zone 206) to its fully released position (corresponding to boundary VPD sensing zone 202). As shown in FIG. 4, sensor release time delay 152b has been selected (e.g., by user input via communication path 170 to configuration information 158) to have a value such that the sensor release time delay 152b is operative to suppress any computing input event from VPD output circuitry 160 during the time that the VPD sensor output signal 114 of the given VPD sensor 112 has a value that lies within VPD sensing zone 204 during release of the depressed VPD sensor 112. In one embodiment, sensor release time delay 152b may be exerted or initiated when the value of a VPD sensor output signal 114 of a given VPD sensor 112 moves from a VPD zone of higher pressure or displacement to a VPD zone of lower pressure or displacement, during which sampling and/or output of a computing input event associated with the VPD sensor output signal 114 of the given VPD sensor 112 is suppressed. Later, a subsequent sampling of VPD output signal 114 for the given VPD sensor 112 is made after expiration of the sensor release time delay 152b to identify if the current VPD sensor output signal 114 corresponds to a VPD zone of lower pressure or displacement, or to a completely released and non-depressed condition of the given VPD sensor 112 (e.g., in which case the sampled output pressure or displacement indicated by VPD output signal 114 is 0 or is below a pre-determined threshold level).

Thus, sensor release time delay 152b may be configured such that when a user intends to fully release the given VPD sensor 112, the assigned computing input events of lower VPD zones are suppressed. For example, referring to FIG. 4, when the given VPD sensor 112 starts in a pressure or displacement condition corresponding to VPD zone 206 and then is released by the user, the assigned computing input events of VPD zone 204 will be suppressed despite the fact that VPD output signal 114 of the given VPD sensor 112 passes through VPD zone 204 as it is released.

For example, given an anticipated quick release (e.g., upwards) of VPD sensor having a duration of about 1 seconds from fully depressed to fully released position, a sensor release time delay 152b of about 0.5 seconds may be selected such that no computing input event is produced during the entire time that VPD sensor output signal 114 of the given VPD sensor 112 has a value that lies within VPD sensing zone 204 as the given VPD sensor 112 is being released by the user and the resulting VPD sensor output signal 114 passes with decreasing sensor pressure or displacement upwards through VPD zone 204. Consequently, no computing event associated with either of VPD sensing zones 206 or 204 is produced during the subsequent sampling of VPD sensor output signal 114 that occurs only after expiration of time delay 152 since VPD sensor 112 is now fully released with its VPD sensor output signal 114 corresponding to fully released VPD sensing zone 202. It is noted that a user may control the timing or rate with which a given VPD sensor 112 is released from a position within VPD sensing zone 206 so as to intentionally cause a computing input event associated with VPD sensing zone 204 to be produced rather than suppressed during VPD sensor release, e.g., by only partially releasing the given VPD sensor 112 from a depressed position corresponding to VPD 206 so that the extent of pressure or displacement represented by VPD sensor output signal 114 remains in VPD sensing zone 204 at the expiration of sensor release time delay 152b. It will be understood that although a relatively quick release operation of a VPD sensor 112 is described above with regard to FIG. 4, duration of sensor release time delay 152b may be selected to be of any desired value that is suitable for a given application and/or user. Thus, greater values of sensor release time delay 152b may be selected such that relatively slow release of a given VPD sensor may result in suppression of an assigned computing input event during the time that the VPD sensor output signal 114 of the given VPD sensor 112 has a value that lies within VPD sensing zone 204. It will be understood that the above example times for release of a fully depressed VPD sensor and sensor release time delay 152b are exemplary only, and that any other greater or lesser values of sensor release time delay 152b may be selected based on any other greater or lesser values of anticipated user sensor release duration as may be suitable or desired for a given application, e.g., based on particular type of VPD sensors 112 and/or anticipated user behavior. It will also be understood that, in one exemplary embodiment, a sensor release time delay 152b may be optionally selected to be of the same time duration as a sensor depression time delay 152a for the same VPD sensor 112.

In one exemplary embodiment, a user may be allowed to enter and change the duration of a time delay for one or more VPD sensors 112 across communication interface 170 and/or to change the relative positions of boundaries 203 and 205, e.g., using a graphical user interface (GUI) on display 504 that is coupled to a host processing device 502 of an information handling system 500 of FIG. 5, or using any other suitable user interface/s. A user may also be allowed to use a user interface to selectably disable time delay 152 for a given VPD sensor 112 such that no computing input events are suppressed regardless of speed (or time) with which the given VPD sensor 112 is depressed or released, until the user decides to selectably enable the time delay 152 to suppress computing input events for depression and/or release of a given VPD sensor 112. In yet other embodiments, a user may be allowed via a user interface to assign different durations of time delay to be implemented by time delay 152 for different applications, and/or to assign a different duration of time delay to be employed by time delay 152 during depression of a VPD sensor 112 than is employed by time delay 152 during release of the same VPD sensor 112 as illustrated by the exemplary time delay values 152a and 152b previously given with regard to the discussion of FIGS. 3 and 4. It will also be understood that time delay 152 need not be activated to suppress competing input events for both VPD sensor depression and VPD sensor release operations, i.e., time delay 152 may only be activated to suppress computing input events during VPD depression and not during VPD release, or time delay 152 may only be activated to suppress computing input events during VPD release and not during VPD depression. In this regard, a user may in one embodiment be allowed to configured time delay 152 to be active only during VPD sensor depression or VPD sensor release.

Thus, it will be understood that a user may in one embodiment be allowed to customize duration and applicability of a time delay 152, and to selectably assign a different or similar time delay 152 to one or more VPD sensors 112 of a sensor system 100. Where a sensor system 100 includes multiple VPD sensors 112, a user may be allowed to assign a different duration of sensor depression and/or sensor release time delay 152b to be used during the same computing session for each different VPD sensor 112 of the given system 100, and/or to enable depression and/or release time delay 152 for a first portion of one or more VPD sensors 112 while not enabling depression and/or release time delay of a second portion of VPD sensors 112 of the same system 100 during the same computing session. In one embodiment, a configuration routine or other program may be provided during which a user may be allowed to change and vary assignment, duration and/or applicability of a time delay 152 to determine the optimum time delay setting for one or more VPD sensors 112. During execution of the configuration program, results of changes to the time delay 152 may in one exemplary embodiment be visually verified by the user in real time, e.g., using an editor application software (e.g., such as Microsoft Windows Notepad) executing on host processing device 502 of FIG. 5 to display display information resulting from the VPD sensor output signals in real time (e.g., the resulting VPD keystrokes or other type of VPD sensor output signal data) on a displayed GUI of display device 504 as a user varies the duration of time delay 152. After termination of this setup period, the last user time delay configuration settings may be configured to become persistent as a fixed time delay until the user initiates another setup period. In other embodiments, duration of a time delay may be fixed and pre-determined, e.g., for a given sensor system 100 and/or a given application executing on a host system receiving VPD output 162. Such a pre-determined time delay duration may be determined, for example, based on empirical measurement of a user's key action, or otherwise selected fit one or more programs or applications to be executed on the host system.

It will be understood that the illustrated embodiments of FIGS. 2-4 are exemplary only, and that other configurations of computing input event suppression technique may be alternatively defined and implemented using the disclosed systems and methods. For example, more than two VPD zones may be defined for a given VPD sensor 112, and/or multiple time delay values may be implemented for a given VPD sensor 112 (e.g., different duration time delays for sensor depression and release, time delay defined for only one of sensor depression or release, etc.) may be employed as required or desired to fit the characteristics of a given sensor system implementation. Moreover, in an alternate embodiment a sensor-suppression time delay may alternatively be initiated when a given VPD sensor 112 is depressed and/or released across any one or more boundaries between two adjacent depressed VPD zones (e.g., such as boundary 205 between depressed VPD zones 204 and 206) rather than only upon VPD sensor depression from an unpressed sensor state (e.g., unpressed VPD zone 203) and VPD sensor release from fully depressed state (e.g., boundary 207)

FIG. 5 is a block diagram of an information handling system 500 as it may be configured according to one exemplary embodiment of the disclosed systems and methods. Information handling system 500 may be, for example, a desktop computer, server, portable information handling system such as a notebook computer or tablet computer, etc. As shown in FIG. 5, information handling system 500 of this exemplary embodiment includes a host processing device 502 which may be a central processing unit CPU such as an Intel Celeron, Pentium, Core, or Xeon series processor, an Advanced Micro Devices (AMD) Athlon I/II, FX, or Phenom I/II series processor, or one of many other suitable processing devices currently available. In this embodiment, CPU 502 may execute an operating system (OS) for system 500. System memory may include main system memory 508 (e.g., volatile random access memory such as DRAM or other suitable form of random access memory), and non-volatile memory (NVM) 514 (e.g., Flash, EEPROM or other suitable non-volatile memory) as shown.

A display 504 (e.g., LCD display or other suitable display device) may be coupled to optional graphics processor 120 to provide visual images (e.g., such as a GUI or other suitable user interface) to the user and optionally receive touch inputs from a user, it being understood that host processing device 502 may include integrated graphic capability that may be coupled directly to display 504 without graphics processor 120. Graphics processor 520 may in turn be coupled to processing device 502 via platform controller hub (PCH) 506 which may be present to facilitate input/output functions for the information handling system 500. Local system storage 512 (e.g., one or media drives such as hard disk drive/s, optical drives, NVRAM, Flash or any other suitable form of internal or external storage) may be coupled as shown to PCH 506 to provide permanent storage for the information handling system. An embedded controller (EC) 530 is also shown coupled to PCH 506. Also illustrated are VPD sensor/s 110 (e.g., keyboard, mouse, touchpad, game controller, etc.) coupled to PCH 506 via VPD circuitry 150 to enable a user to interact with the information handling system 500 and programs or other software/firmware executing thereon in a manner as described elsewhere herein.

It will be understood that the particular configuration of FIG. 5 is exemplary only, and that an information handling system may be configured with fewer, additional or alternative components than those illustrated in FIG. 5, e.g., including a network interface card (wired and/or wireless). It will also be understood that one or more of the tasks, functions, or methodologies described herein (e.g., including those described herein for components 150, 502, 530, etc.) may be implemented, for example, as software, firmware or other computer program of instructions embodied in a non-transitory tangible computer readable medium that is executed by a CPU, controller, microcontroller, processor, microprocessor, FPGA, ASIC, or other suitable processing device or combination of such processing devices.

Figure 6:
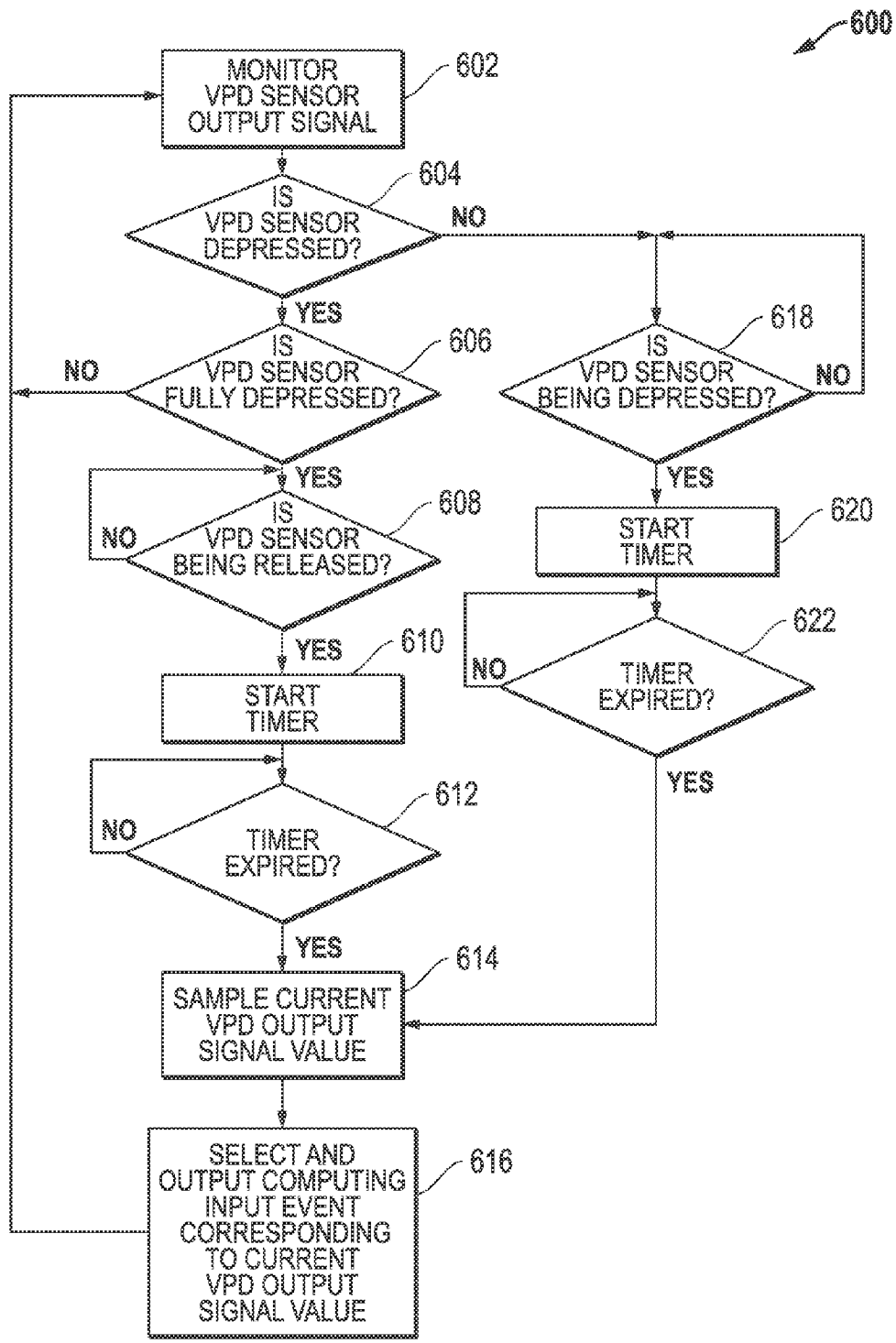
FIG. 6 illustrates methodology according to one exemplary embodiment of the disclosed systems and methods.

FIG. 6 illustrates one exemplary embodiment of methodology 600 that may be employed (e.g., by processing device of VPD circuitry 150) to selectably suppress computing input events that are generated from a given VPD sensor 112 of a VPD sensor system 100, e.g., such as illustrated and described in relation to the embodiments of FIGS. 1-5. As shown, methodology 600 starts in step 602 where the processing device of VPD circuitry 150 monitors VPD sensor output signals. In step 604 the processing device determines whether the given VPD sensor 112 is currently depressed and, if so, then determines in step 606 whether the given VPD sensor 112 is fully depressed (e.g., depressed downward to boundary 207 of FIGS. 2-4). If the given VPD sensor 112 is not fully depressed in step 606 (e.g., is only partially depressed between boundaries 203 and 207 of FIGS. 2-4), then the methodology 600 returns to step 602 and repeats. However, if it is determined that the VPD sensor 112 is fully depressed in step 606, methodology 600 proceeds to step 608 to determine if the given fully depressed VPD sensor 112 is being released. Step 608 repeats as shown until it is detected that the given VPD sensor 112 is being released, and proceeds to step 610 where a sensor release timer is started that has a defined duration that is equal to a selected sensor-suppression time delay such as previously described herein. Methodology 600 then proceeds to step 612 and repeats as shown to determine when the sensor-suppression time delay has expired, and then upon timer expiration proceeds to step 614 where the current (i.e., after time delay) value of VPD output signal 114 for the given VPD sensor 112 is sampled, and then to step 616 where a computing input event is selected for output in VPD circuitry output 162 based on the VPD sensing zone in which the current real time VPD output signal 114 value lies.

Returning to step 604 of methodology 600, if the given VPD sensor 112 is determined in step 606 to be currently unpressed, then methodology 600 proceeds to step 618 to monitor for depression of the given VPD sensor 112. When the given VPD sensor 112 is determined to be depressed (e.g., at least partially depressed downwards past boundary 203 of FIGS. 2-4), methodology 600 proceeds to step 620 where a sensor depression timer is started that has a defined duration that is equal to a selected sensor-suppression time delay such as previously described herein, it being understood that the time delay value of step 620 may be the same or may be different (i.e., greater or lesser time) than the time delay value of step 610. Methodology 600 then proceeds to step 622 and repeats as shown to determine when the sensor-suppression time delay of step 620 has expired, and then upon timer expiration then proceeds to step 614 where the current (i.e., after time delay) value of VPD output signal 114 for the given VPD sensor 112 is sampled, and then to step 616 where a computing input event is selected for output in VPD circuitry output 162 based on the VPD sensing zone in which the current real time VPD output signal 114 value lies.

It will be understood that the embodiment of FIG. 6 is exemplary only, and that any other combination of fewer, additional, and/or alternative steps may be performed that are suitable to selectably suppress computing input events that are generated from a given VPD sensor of a VPD sensor system. Moreover, it will be understood that in one alternative embodiment steps 602, 604 and 618-616 may be practiced without steps 606-612, and that in another alternative embodiment steps 602, 604 and 606-612 may be practiced without steps 618-616. Moreover, although methodology 600 is described above in relation to components of VPD sensor system 100 of FIG. 1, methodology 600 may be implemented with any other suitable alternative configuration of VPD sensor system components.

It will also be understood that one or more of the tasks, functions, or methodologies described herein (e.g., for processing device/s of VPD circuitry 150) may be implemented, for example, as firmware or other computer program of instructions embodied in a non-transitory tangible computer readable medium that is executed by one or more processing devices such as CPU, controller, microcontroller, processor, microprocessor, FPGA, ASIC, or other suitable processing devices. In this regard, one or more features and/or functions of the systems and methods described herein may be implemented in one exemplary embodiment by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed (e.g., executed on a processing device such as a processor, microprocessor, microcontroller, controller, etc.) to perform at least a portion of the systems and methods described herein. A computer program of instructions may be stored in or on the non-transitory computer-readable medium residing on or accessible by one or more processing device/s (e.g., embodied in a computer system) for instructing the processing device/s to execute the computer program of instructions. The computer program of instructions may include an ordered listing of executable instructions for implementing logical functions in the processing device/s. The executable instructions may comprise a plurality of code segments operable to instruct the processing device/s to implement and perform at least a portion of the systems and methods disclosed herein. It will also be understood that one or more steps of the systems and methods described herein may be employed in one or more code segments of the present computer program. For example, a code segment executed by the processing device/s may include one or more steps of the disclosed systems and methods.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A variable pressure or displacement (VPD) sensor system, comprising:
   at least one VPD sensor coupled to provide a VPD sensor output signal that includes raw sensor data that is representative of the real time pressure or displacement currently being applied to the VPD sensor; and
   VPD circuitry coupled to receive the VPD sensor output signal from the at least one VPD sensor, the VPD circuitry comprising at least one first processing device configured to:
      process the raw sensor data of the received VPD sensor output signal to determine whether the real time pressure or displacement currently being applied to the VPD sensor corresponds to one of a defined first zone of lower sensed pressure or displacement being currently applied to the VPD sensor or a defined second zone of higher sensed pressure or displacement being currently applied to the VPD sensor, each of the defined first and second VPD zones being associated with a particular computing input event,
      select the computing input event associated with the particular defined VPD zone which corresponds to the real time pressure or displacement currently being applied to the VPD sensor, and
      generate a VPD circuitry output signal including the selected computing input event to a second processing device only after a duration of a time delay period that begins when pressure or displacement is at least partially applied to the VPD sensor or when existing pressure or displacement is at least partially released from the VPD sensor;
   where the first processing device of the VPD circuitry is further configured to generate a VPD circuitry output signal including the selected computing input event to a second processing device only after a duration of a sensor depression time delay period that begins when pressure or displacement is at least partially applied to the VPD sensor, and only after a duration of a sensor release time delay period that begins when existing pressure or displacement is at least partially released from the VPD sensor.

2. The system of claim 1, where the sensor depression time delay period begins when pressure or displacement is first applied to the VPD sensor while it is in a non-depressed state.

3. The system of claim 1, where the VPD system comprises at least one of a keyboard system having at least one VPD key sensor, a computer mouse system having at least one VPD mouse button sensor, a game controller having at least one VPD game controller button sensor, or a touchpad having at least one VPD sensor touchpad area.

4. The system of claim 1, where each of the defined first and second VPD zones is associated with a different computing input event.

5. The system of claim 1, where each of the computing events associated with each of the defined first and second VPD zones include one or more pressure or displacement-based key codes or an alternating high and low (high/low) digital output bit stream signal of a particular frequency.

6. The system of claim 1, where the VPD circuitry further comprises user configuration information stored on at least one storage device that is accessible by the first processing device, the user configuration information including the duration of the time delay periods; where the storage device is accessible by a user to allow the user to change the duration of the time delay periods; and where the first processing device is configured to access the user configuration information to determine the duration of the time delay periods.

7. The system of claim 1, where the VPD circuitry further comprises user configuration information stored on at least one storage device that is accessible by the first processing device, the user configuration information including information that defines the upper and lower boundaries of each of the VPD zones; where the storage device is accessible by a user to allow the user to change the upper and lower boundaries of each of the VPD zones; and where the first processing device is configured to access the user configuration information to determine the upper and lower boundaries of each of the VPD zones.

8. The system of claim 1, where the VPD circuitry further comprises user configuration information stored on at least one storage device that is accessible by the first processing device, the user configuration information including information that associates each of the VPD zones with a corresponding computing input event; where the storage device is accessible by a user to allow a user to change computing input events associated with each of the VPD zones; and where the first processing device is configured to access the user configuration information to the computing input event associated with the particular defined VPD zone which corresponds to the real time pressure or displacement currently being applied to the VPD sensor.

9. The system of claim 1, where the sensor depression time delay period begins when pressure or displacement applied to the VPD sensor enters the defined first zone of lower sensed pressure or displacement.

10. An information handling system comprising:
    a variable pressure or displacement (VPD) sensor system comprising VPD circuitry that includes at least one first processing device; and
    a second processing device that is configured as a host processing device to execute at least one application;
    where the VPD sensor system is coupled to exchange information and data with the host processing device; and where the VPD sensor system further comprises at least one VPD sensor coupled to provide a VPD sensor output signal to the VPD circuitry, the VPD sensor output signal including raw sensor data that is representative of the real time pressure or displacement currently being applied to the VPD sensor; and
    where the first processing device of the VPD circuitry is configured to:
       process the raw sensor data of the received VPD sensor output signal to determine whether the real time pressure or displacement currently being applied to the VPD sensor corresponds to one of a defined first zone of lower sensed pressure or displacement being currently applied to the VPD sensor or a defined second zone of higher sensed pressure or displacement being currently applied to the VPD sensor, each of the defined first and second VPD zones being associated with a particular computing input event,
       select the computing input event associated with the particular defined VPD zone which corresponds to the real time pressure or displacement currently being applied to the VPD sensor, and generate a VPD circuitry output signal including the selected computing input event to a second processing device only after a duration of a time delay period that begins when pressure or displacement is at least partially applied to the VPD sensor or when existing pressure or displacement is at least partially released from the VPD sensor;

where the first processing device of the VPD circuitry is further configured to generate a VPD circuitry output signal including the selected computing input event to a second processing device only after a duration of a sensor depression time delay period that begins when pressure or displacement is at least partially applied to the VPD sensor, and only after a duration of a sensor release time delay period that begins when existing pressure or displacement is at least partially released from the VPD sensor.

11. The information handling system of claim 10, the VPD circuitry further comprises user configuration information stored on at least one storage device that is accessible by the first processing device, the user configuration information including the duration of the time delay periods; where the storage device is accessible by a user through host processing device to allow the user to change the duration of the time delay periods; and where the first processing device is configured to access the user configuration information to determine the duration of the time delay periods.

12. The information handling system of claim 11, further comprising a display device coupled to the host processing device configured to display information to a user; and where the host processing device is configured to execute at least one application to display information resulting from the VPD sensor output signals on the display device as the user varies the duration of the time delay periods.

13. A method of processing variable pressure or displacement (VPD) sensor output signals, comprising:

receiving a VPD sensor output signal in VPD circuitry that includes at least one first processing device, the VPD sensor output signal including raw sensor data that is representative of the real time pressure or displacement currently being applied to the VPD sensor; and causing the at least one first processing device of the VPD circuitry to:

process the raw sensor data of the received VPD sensor output signal to determine whether the real time pressure or displacement currently being applied to the VPD sensor corresponds to one of a defined first zone of lower sensed pressure or displacement being currently applied to the VPD sensor or a defined second zone of higher sensed pressure or displacement being currently applied to the VPD sensor, each of the defined first and second VPD zones being associated with a particular computing input event, select the computing input event associated with the particular defined VPD zone which corresponds to the real time pressure or displacement currently being applied to the VPD sensor, and generate a VPD circuitry output signal including the selected computing input event to a second processing device only after a duration of a time delay period that begins when pressure or displacement is at least partially applied to the VPD sensor or when existing pressure or displacement is at least partially released from the VPD sensor;

where the method further comprises causing the at least one first processing device of the VPD circuitry to generate a VPD circuitry output signal including the selected computing input event to a second processing device only after a duration of a sensor depression time delay period that begins when pressure or displacement is at least partially applied to the VPD sensor, and only after a duration of a sensor release time delay period that begins when existing pressure or displacement is at least partially released from the VPD sensor.

14. The method of claim 13, where each of the defined first and second VPD zones is associated with a different computing input event; and where each of the computing events associated with each of the defined first and second VPD zones include one or more pressure or displacement-based key codes or an alternating high and low (high/low) digital output bit stream signal of a particular frequency.

15. The method of claim 13, further comprising using the first processing device to access user configuration information stored on at least one storage device, the user configuration information including the duration of the time delay periods; allowing a user to access the storage device to change the duration of the time delay periods of the user configuration information; and using the first processing device to access the user configuration information to determine the duration of the time delay periods.

16. The method of claim 13, where the sensor depression time delay period begins when pressure or displacement applied to the VPD sensor enters the defined first zone of lower sensed pressure or displacement.

* * * * *